United States Patent
Blum

(10) Patent No.: US 8,741,112 B2
(45) Date of Patent: Jun. 3, 2014

(54) ANODE DEVICE FOR AN ELECTRO-FLOCCULATION CELL

(76) Inventor: Holger Blum, Teufen (CH)

( * ) Notice: Subject to any disclaimer, the term of this patent is extended or adjusted under 35 U.S.C. 154(b) by 349 days.

(21) Appl. No.: 12/920,868

(22) PCT Filed: Sep. 25, 2008

(86) PCT No.: PCT/EP2008/008165
§ 371 (c)(1),
(2), (4) Date: Nov. 29, 2010

(87) PCT Pub. No.: WO2009/109207
PCT Pub. Date: Sep. 11, 2009

(65) Prior Publication Data
US 2011/0062018 A1    Mar. 17, 2011

(30) Foreign Application Priority Data
Mar. 3, 2008    (DE) .................... 20 2008 003 027 U

(51) Int. Cl.
*C02F 1/463*    (2006.01)

(52) U.S. Cl.
USPC ........................... 204/277; 205/753; 205/754

(58) Field of Classification Search
USPC .................. 205/742–761, 144, 348; 210/293
See application file for complete search history.

(56) References Cited

U.S. PATENT DOCUMENTS

| | | | | |
|---|---|---|---|---|
| 3,081,877 A | * | 3/1963 | Jakobs et al. ................ | 210/293 |
| 3,498,462 A | * | 3/1970 | Larrowe et al. .............. | 210/289 |
| 3,523,891 A | * | 8/1970 | Mehl ........................... | 210/707 |
| 3,915,822 A | * | 10/1975 | Veltman ...................... | 210/665 |
| 4,351,734 A | * | 9/1982 | Kauffman ................. | 210/748.19 |
| 4,579,659 A | * | 4/1986 | Eades et al. .................. | 210/541 |
| 4,776,962 A | * | 10/1988 | Wakeman ................ | 210/748.01 |

(Continued)

FOREIGN PATENT DOCUMENTS

| | | |
|---|---|---|
| DE | 19724005 C1 | 7/1999 |
| JP | 2004-66010 A | 3/2004 |
| WO | WO-92-22503 A1 | 12/1992 |
| WO | WO-2007-140802 A1 | 12/2007 |

OTHER PUBLICATIONS

Heim, Patrick, PCT International Search Report and Written Opinion of the International Searching Authority, PCT Application No. PCT/EP08/08165, Jan. 16, 2009.

*Primary Examiner* — Nicholas A Smith
*Assistant Examiner* — Ciel Thomas
(74) *Attorney, Agent, or Firm* — Nawrocki, Rooney & Sivertson, P.A.

(57) ABSTRACT

An anode device for an electro-flocculation cell, is provided comprising a bed of metal granules (1c) through which raw water is flown from the bottom to the top, is loosely provided in a cell box (3) out of insulating material on an electrically conducting electrode (1) plate provided with insulating material nozzles (Da1-Dc1) and serving as current feeding means to the metal granules (1c), further comprising non-conducting, hydraulic tube connections (6a-6c) which are provided from the insulating material nozzles (Da1-Dc1) to outlet sockets of the tubular manifold (7) for raw water, and at least two gas injectors (9) for the supply of driving a gas which are protruding into the tubular manifold (7) and are connected to a gas supply device (8), wherein fluid connections for the driving gas and the raw water are provided from the outlet sockets (7a1-7c1) of the tubular manifold (7) through to the non-conducting tube connections and the insulating material nozzles to the metal granules (Ic) provided within the cell box (3).

19 Claims, 3 Drawing Sheets

(56) References Cited

U.S. PATENT DOCUMENTS 5,376,279 A * 12/1994 Judd et al. .................. 204/518
5,407,571 A * 4/1995 Rothwell ...................... 210/232
6,572,759 B1 * 6/2003 Nishimura et al. ........... 205/687

* cited by examiner

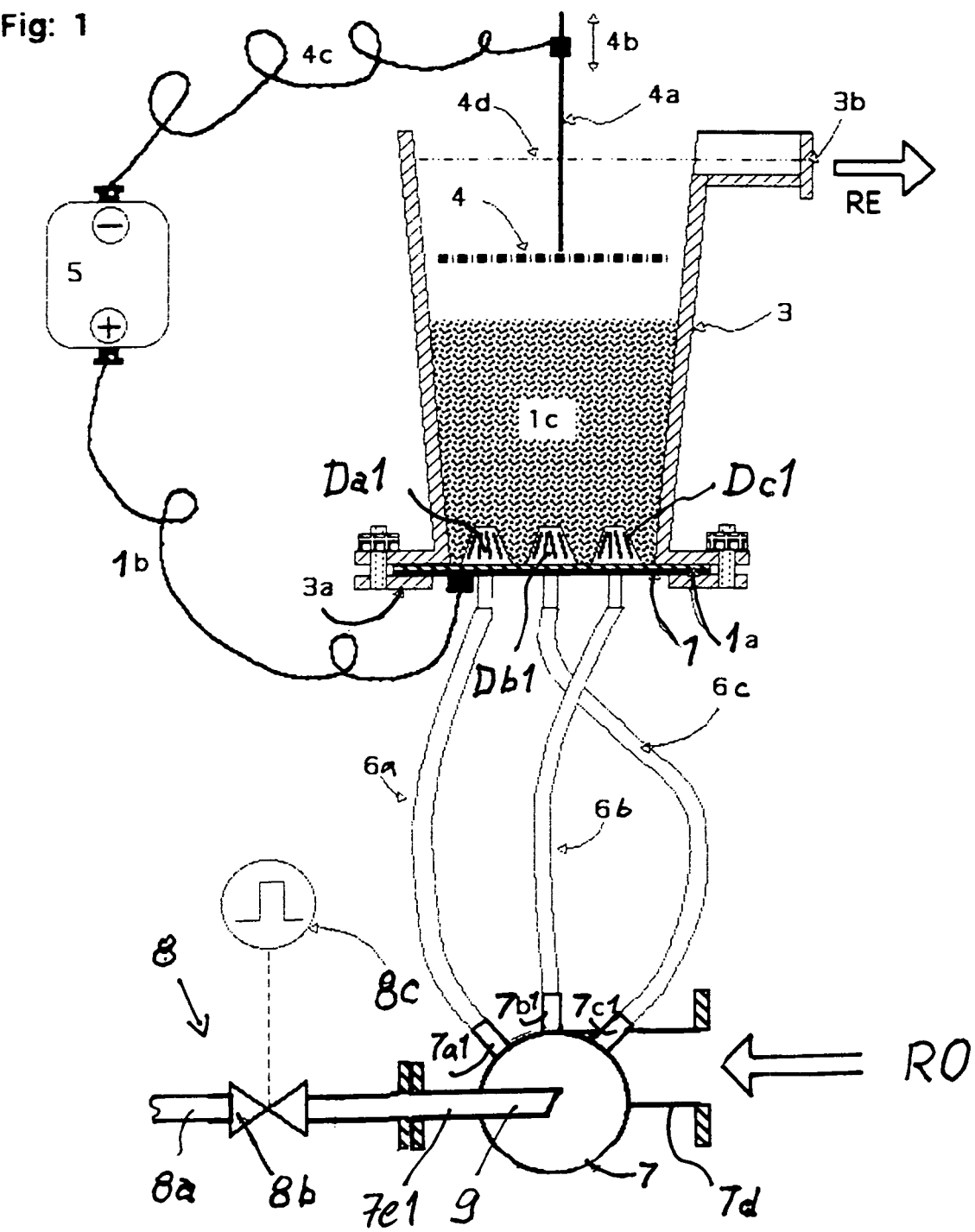
Fig: 1

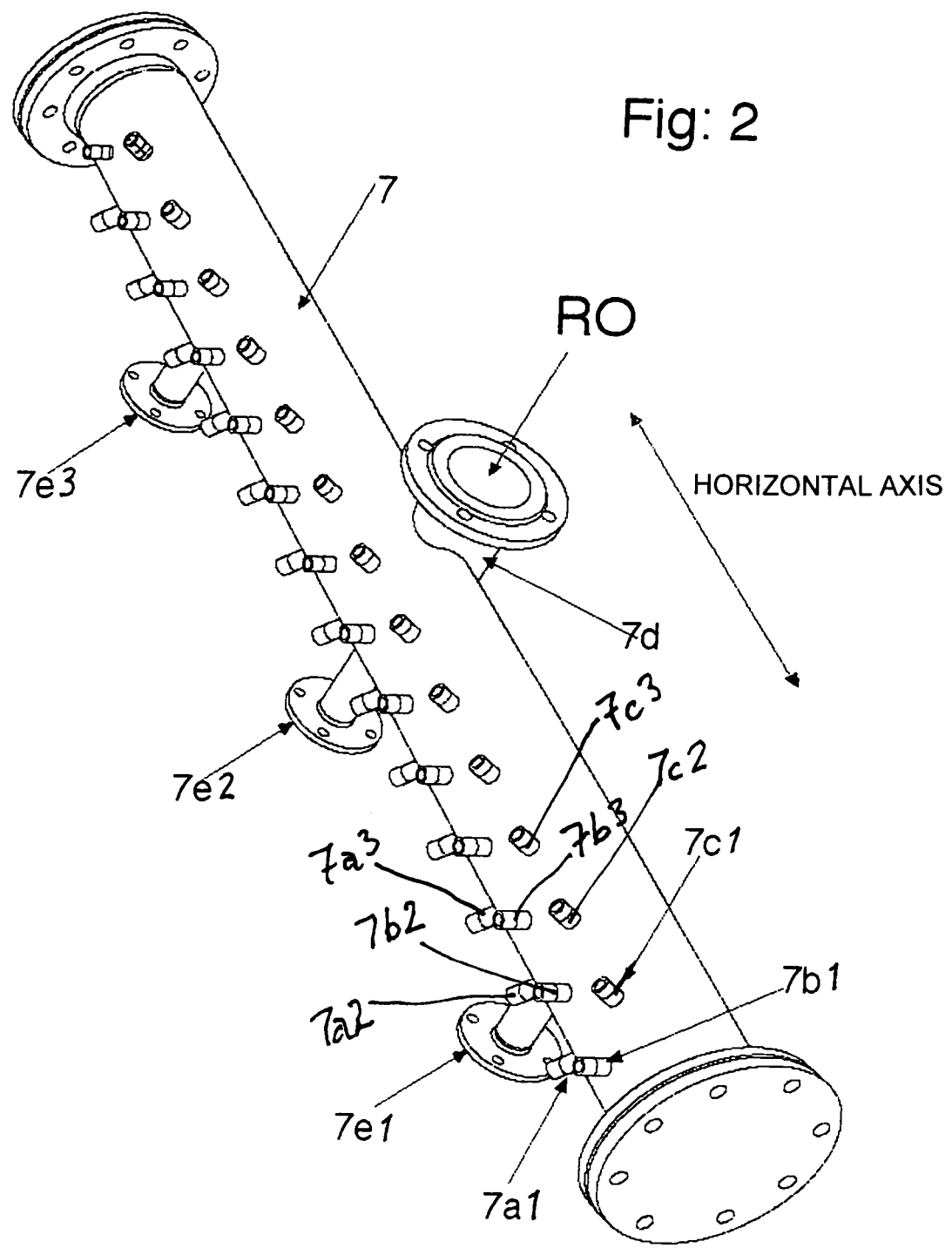
Fig: 2

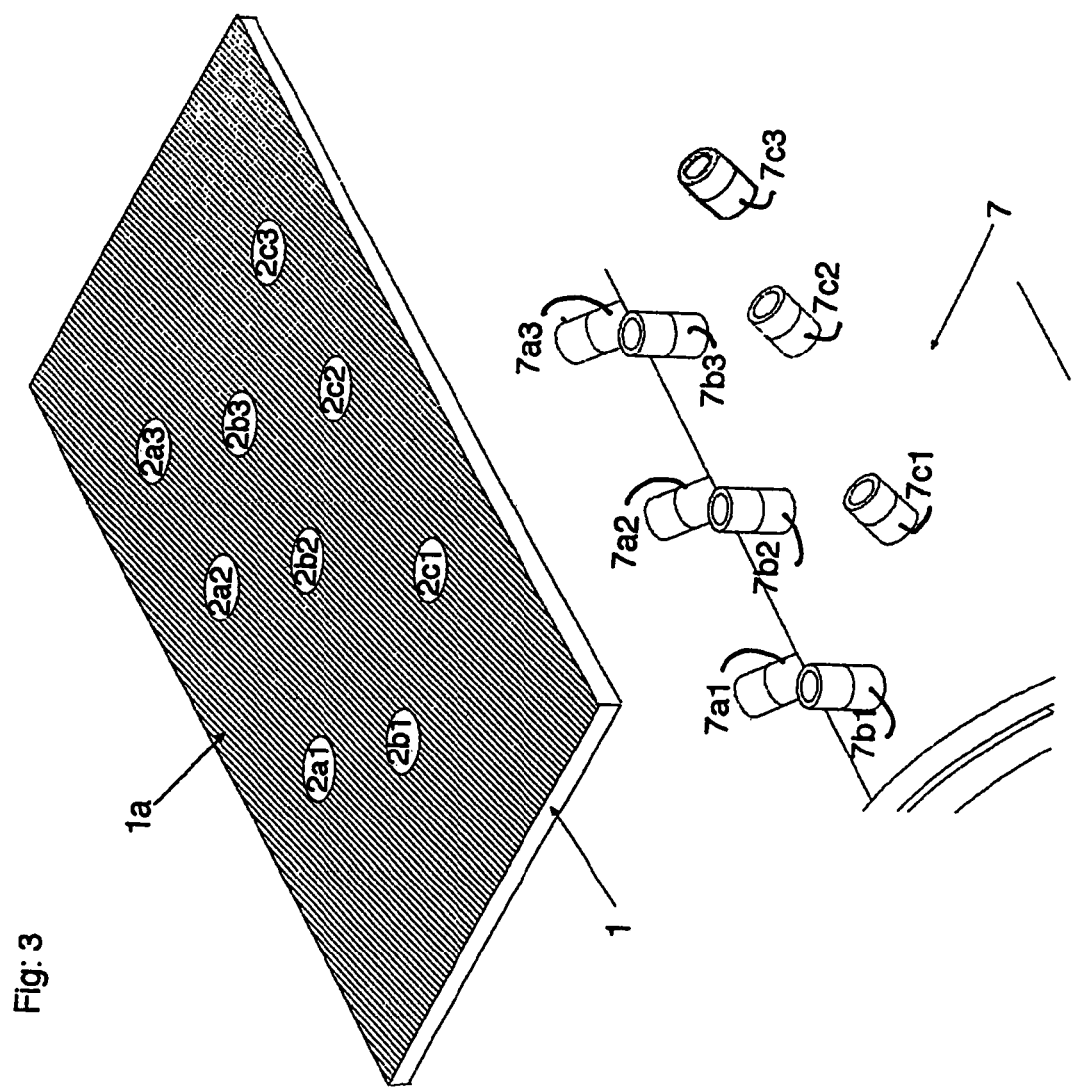
Fig: 3

ANODE DEVICE FOR AN ELECTRO-FLOCCULATION CELL

The invention relates to an anode device for an electro-flocculation cell.

The WO 2007/140802 describes an electro-flocculation cell with an electrode in form of a loose, non fluidized bed of metal granules which bed is kept in a periodic movement by means of pulsed gas injections. The metal granules are supported by a suitable metal plate provided with jet openings which metal plate also serves as a current feeding means. Furthermore, the electro-flocculation cell contains a second electrode consisting of a metal sieve or a metal grid. The second electrode is movably supported above the metal granules but below the liquid level of the cell. If the positive terminal of a direct current generator is connected to the support plate for the metal granules which plate also serves as a current feeding means, the electrode serves as an anode. The electrode in form of a metal sieve or metal grid which is connected to the negative terminal of the direct current generator, accordingly serves as cathode in the electro-flocculation cell.

According to WO 2007/140802, the electro-flocculation cell is operated with a cell voltage of about 20 to 36 volt. In this configuration, the electro-flocculation cell can only be used for purifying waste water from contaminants and harmful substances, in particular for removing pharmaceutical residues from water after waste water treatment, as experiments have shown which were carried out 2007 in a pilot plant having a throughput of 200 $m^3$/day.

The configuration with metal granules as anodes, as shown in the WO 2007/140802, shows technical deficiencies at a voltage above about 38V. The metallic support plate has a comparatively short lifetime because it is heavily attacked by the electrolyte. The effect of the circulation of the anode bed by means of a driving gas on a slightly tilted support plate depends to a large extend on the quality of the cast iron chippings used as metal granules. Usually, so called cast iron lathing chips are used as iron granules in the electro-flocculation cell. These cast iron lathing chips are a waste product of the metal working industry and can vary to a large extend with respect to their appearance and purity.

It is an object of the invention, to provide an anode device for an electro-flocculation cell which has a simple structure and in which a faultless, uniform operation without interruptions is possible at elevated cell voltages, in particular independent of the quality of the cast iron chips used.

For achieving this object, the device according to the invention is characterized in that a bed of metal granules through which raw water is flown from the bottom to the top, is loosely provided in a cell box out of insulating material on an electrically conducting electrode plate provided with insulating material nozzles and serving as current feeding means to the metal granules, that non-conducting, hydraulic tube connections are provided from the insulating material nozzles to outlet sockets of the tubular manifold for raw water and at least two gas injectors for the supply of driving a gas which are protruding into the tubular manifold and are connected to a gas supply device, whereby fluid connections for the driving gas and the raw water are provided from the outlet sockets of the tubular manifold through to the non-conducting tube connections and the insulating material nozzles to the metal granules provided within the cell box.

In spite of this simple arrangement, a highly reliable, failure-free operation of the anode device at high direct voltages and differing qualities of the metal granules can be obtained in an advantageous way. The anode granules are slowly and evenly circulated. Furthermore, one obtains a long lifetime of the metallic support plate for the metal granules while using the invention. Because of the compact construction and the continuous current flow in the anode device, the operation null and maintenance efforts are very low.

The characteristic operational figure for an electro-flocculation cell having movable electrodes according to WO 2007/140802 is the raw water amount in cubic meters per hour which can be purified at a fixed temperature and contamination quantity per square meter of cell surface. It has been verified by experiments that the anode device according to the invention allows a surface load of the cell higher by 50 to 70% whereby an increase of the characteristic operational figure by 50 to 70% may be reached.

According to an advantageous embodiment of the invention, the movable anode granules consist out of cast iron chips which are a particularly low priced raw material.

According to an advantageous embodiment of the invention, the movable anode granules consist out of magnesium granules or aluminum granules or out of a granular aluminum magnesium alloy whereby a stainless flocculate is obtained in an advantageous way.

According to an advantageous embodiment of the invention, the electrode plate consists out of a support plate and a metal layer which forms a contact surface to the metal granules. Thereby, a good stability of the support plate is made possible and, on the other hand, a good contact to the anode granules is achieved in an advantageous way.

According to an advantageous embodiment of the invention, the metal layer consists out of a noble metal, preferably out of silver or platinum or out of a silver platinum alloy, whereby an additional protection of the support plate and, thereby, a longer lifetime of the device is achieved in an advantageous way. A metal layer out of noble metal is particularly advantageous in view of the cost-benefit ratio of the device since the materials are admittedly expensive at the one hand but lead to a long lifetime on the other hand.

According to an advantageous embodiment of the invention, the support plate for the metal granules is arranged horizontally and forms the bottom of the cell box whereby the construction effort can be kept low in an advantageous way.

According to an advantageous embodiment of the invention, the support plate for the metal granules consists out of copper or brass or iron whereby a good stability may be achieved at low cost in an advantageous way.

According to an advantageous embodiment of the invention, the insulating material nozzles which are inserted into the support plate, consist out of polypropylene or ceramic material whereby a good insulation is achieved at low costs in an advantageous way.

According to an advantageous embodiment of the invention, the insulating material nozzles inserted into the support plate for the metal granules, are arranged in several rows, and the horizontal tube manifold comprises a corresponding number and rows of connection sockets for the tube connections to the insulating material nozzles, wherein a row of connecting sockets arranged on an upper side is alternatively connected to insulating material nozzles which are located on one or the other side and area of the supporting plate. The connecting system of the tube connections from the insulating material nozzles to the output sockets of the tubular manifold and the pulsed injection of driving gas into the manifold results in that a slow circulation of the movable anode granules is achieved. Thereby, mixing of the anode granules is much more uniform and is achievable with less driving gas as compared to the arrangement of the driving gas nozzles according to WO 2007/140802.

According to an advantageous embodiment of the invention, the non-conducting hydraulic tube connections from the insulating material nozzles to the output sockets of the horizontal tubular manifold for the raw water consists out of polyethylene or out of ethylene-propylene-diene (EPDM) resin or out of softened polyvinylchloride whereby a good insulation between the insulation material nozzles and the tubular manifold may be obtained with shorter tube connections in an advantageous way.

According to an advantageous embodiment of the invention, the non-conducting, hydraulic tube connections from the insulating material nozzles to the tubular manifold for the raw water have a length of at least 0.5 to 2 meter each, preferably a length of 1 to 3 meters. By means of the advantageously high insulation between the tubular manifold and the anode potential of the metal granules, the generation of leakage currents if definitely suppressed such that the cells comprise a high current usage be means of the anode device according to the invention.

According to an advantageous embodiment of the invention, the inner diameter of the horizontal, hydraulic tubular manifold is four to ten times as large as the inner diameter of the non-conducting hydraulic tube connection whereby a good distribution of raw water and driving gas is achieved in the tubular manifold in an advantageous way.

According to an advantageous embodiment of the invention, the gas supply device is provided for a pulsed supply of driving gas and has radial sockets by means of which the driving gas is injected as pulses into the tubular manifold whereby the sockets are preferably not arranged on the same axial portion of the tubular manifold.

According to an advantageous embodiment of the invention, the support plate for the anode granules is fixed by means of an insulating flange from below to a cell box out of insulating material which is open to the top, whereby again the construction effort and good stability of the cell box is capped low. According to an advantageous embodiment of the invention, the cell box is widened to the top. Thereby, refilling of anode granules is facilitated in an advantageous way.

According to an advantageous embodiment of the invention, in the cell box below the water level but above the anode granules, a metal cathode in form of a grid or metal sieve is fixed and movable upwards and downwards. Thereby, the position of the cathode may be adapted to the filling level of the anode granules in an advantageous way.

According to an advantageous embodiment of the invention, a direct current source, preferably a direct current generator, is connected to the support plate with the positive terminal and the metal cathode with the negative terminal which generator provides a direct voltage of about 40 to 400 Volt. It has been found that the cleaning effect is improved if the cell voltage is above 40 Volt direct voltages. Certain contaminations present in the water, for example so called perfluorine tensides, can be precipitated in an electro-flocculation cell filled with iron granules as anode material, by means of cell voltages of about 120 to 400 Volt as innoxious iron salts and can be filtered from the water. The anode device of this embodiment is particularly suitable for the operation under high direct voltage in the electro-flocculation cell and, therefore, for the above mentioned application.

Embodiments of the invention are explained with reference to the attached drawings in which:

FIG. 1 schematically shows the flow chart of the anode device according to the invention, FIG. 2 shows a perspective view of a manifold tube, and FIG. 3 explains the connection scheme between the tubular manifold and the insulating material nozzles.

As can be seen from FIG. 1, the metallic anode granules 1c are provided in a cell box 3 which is slightly enlarged in direction to the top. The cell box has one or several output openings 3b for the clean water stream RE and is filled with water up to the liquid level 4d. Above the anode granules 1c but below the liquid level 4d, one or several metal grids 4 are fixed by means of a fixture 4a. The fixtures 4a are also simultaneously serve as fixtures for the current supply to the metal grid 4. The metal grid is brought into periodic oscillations by means of a mechanical vibrator 4b. The current supply cable 4c is connected to the negative terminal of the direct current generator 5.

The anode granules rest on a noble metal layer 1a by which a support plate 1 is covered. The support plate 1 is fixed to the cell box 3 by means of the flange 3a in a liquid tight manner. If the support plate 1 is out of metal, it is connected to the positive terminal of the direct current generator 5 by means of the current conducting cable 1b. If the support plate 1 is not out of metal, the metallic layer is connected with the positive terminal of the direct current generator 5 by means of the current conducting cable 1b.

In FIG. 3 the support plate 1 comprises three rows of bores 2a1, 2a2, 2a3; 2b1, 2b2, 2b3; 2c1, 2c2 and 2c3 into which three rows of insulating material nozzles are inserted in a liquid tight manner. In the sectional view of the electro-flocculation cell according to FIG. 1, the nozzles Da1, Db1, Dc1 of the first row of nozzles are shown which are arranged in the bores 2a1, 2b1, 2c1 in the support plate 1.

The insulating material nozzles Da1, Da2, Da3 and the insulating material nozzles in the bores 2a2, 2a3; 2b2, 2b3; 2c2, 2c3 (not shown) contain openings or slits out of which the raw water enters the area of the anode granules. The insulating material nozzles are inserted into the support plate 1 in such a way that enough metallic contact surface 1a out of noble metal is provided in order to ensure a secure electrical connection to the anode granules 1c.

The insulation material nozzles are each connected to non conductive, hydraulic tube connections out of which only the tube connections 6a, 6b and 6c to the respective first insulating material nozzles Da1, Db1, Dc1 are shown. The non conduction hydraulic tube connections 6a, 6b and 6c are preferably plastic tubes consisting out of a material which is inert against water, such as polyethylene, EPDM-resin or softened polyvinylchloride.

The non-conducting hydraulic tube connections 6a, 6b and 6c comprise preferably a length to 1 to 3 meters. As has been confirmed by experiments, the optimal lengths of the non-conducting hydraulic tube connections 6a, 6b and 6c depends from the conductivity of the raw water. The higher the conductivity of the raw water the longer the non conductive hydraulic tube connections 6a, 6b and 6c should be in order to ensure an optimal, failure-free operation of the anode device according to the invention.

A further component of the anode device is the hydraulic tubular manifold 7 as shown in FIG. 1. The tubular manifold 7 serves to distribute the raw water stream RO such that an equal partial quantity of raw water RO enters the moved anode bed 1c through each of the insulating material nozzles.

In order to fulfill this purpose, the tubular manifold 7 has several rows of output sockets 7a1, 7a2, 7a3; 7b1, 7b2, 7b3; 7c1, 7c2 and 7c3. The number of output sockets 7a1, 7a2, 7a3; 7b1, 7b2, 7b3; 7c1, 7c2 and 7c3 in the rows of the tubular manifold 7 corresponds to the number of the insulating material nozzles in the rows in the support plate 1.

In the cross sectional view of the tubular manifold in FIG. 1, the first output socket 7a1 of the first row of output sockets 7a1, 7a2, 7a3 at the tubular manifold 7 is shown. The first output socket 7b2 in the second row of the output sockets 7b1, 7b2, 7b3 on the tubular manifold 7 is also shown. The first output socket 7c1 of the third row of output sockets 7c1, 7c2, 7c3 on the tubular manifold 7 is also shown. This arrangement can also be seen from the perspective view of FIG. 2. The hydraulic tubular manifold 7 is supported in a horizontal position.

As can be seen from FIG. 2, the tubular manifold comprises an input socket 7d for the raw water stream RO. Furthermore, the tubular manifold 7 comprises at 25 least two gas injectors 9 extending into the tubular manifold and provided for the pulsed supply of driving gas through a high pressure conduit 8a and a gas valve 8b. Compressed air or compressed hydrogen is preferably used as driving gas.

A gas supply device 8 comprises a pulse control 8c, a gas valve 8b and a high pressure line 8a. The pulse control 8c is configured to open the gas valve 8b during a short period of time which gas valve is connected to the high pressure conduit 8a for driving gas. Therefore, a well defined amount of driving gas enters the tubular manifold 7 filled with raw water, through an input socket 7e1 and is accumulated in the upper part of the horizontally arranged tubular manifold 7 because of the hydraulic situation in the manifold. Accordingly, a partial amount of the driving gas which is injected in pulses, exits mainly through the output sockets 7b1, 7b2, 7b3 which are arranged next to the input socket 7e1. In the same way, a certain amount of driving gas enters into the tubular manifold 7 filled with raw water, through an inlet socket 7e2 and accumulates in the upper portion of the horizontally arranged tubular manifold 7 such that a partial amount of the driving gas which is injected in pulses, mainly exits through the output sockets of the second row which lay next to the inlet socket 7e2. In the way, a certain amount of driving gas reaches the tubular manifold 7 filled with raw water, through an input socket 7e3 and is accumulated in the upper portion of the horizontally arranged tubular manifold 7 such that a partial amount of the driving gas injected in pulses, mainly exits through the outlet sockets of the second row which lay next to the input socket 7e3.

The outlet sockets 7b1, 7b2, 7b3 of the tubular manifold 7 are connected through the non-conductive hydraulic tube connections 7d alternatively with the insulating material nozzles of the first and third row of insulating material nozzles in the support plate 1.

As can be seen from FIG. 1, a partial stream of the raw water RO flows from the outlet sockets 7a1 into the tube conduit 6a and flows, further on, through the insulating material nozzle Da1 into the area of the movable anode granules 1c. A further partial stream of the raw water RO flows from the outlet sockets 7b1 into the tube conduit 6b and flows, further on, through the insulating material nozzle Dc1 into the area of the movable anode granules 1c. A further partial stream of the raw water RO flows from the outlet socket 7c1 into the tube conduit 6c and flows, further on, through the insulating material nozzle Db1 into the area of the movable anode granules 1c.

When the gas valve 8b between the inlet socket 7e1 and the gas injector 9 is intermittently opened by the pulse control 8c, an amount of gas enters the tubular manifold 7 from the pressure conduit 8a through the gas injector 9 and exit mainly from the outlet sockets 7b1, 7b2, 7b3 of the second row which are arranged on the top of the tubular manifold 7. Accordingly, a partial amount of the driving gas enters the insulating material nozzle Dc1 through the outlet socket 7b1 and the tubular conduit 6b and effects a short term, local circulation on the right hand side of the anode bed out of loosely supported metal granules.

FIG. 3 explains the denomination of insulating material nozzles (not shown) which are arranged in the bores 2a1, 2a2, 2a3; 2b1, 2b2, 2b3; 2c1, 2c2 and 2c3, and the outlet sockets in this scheme of connections.

The tube conduits 6a, 6b, 6c are arranged between the insulating material nozzles Da1, Db1, Dc1 in the bores 2a1, 2b1 and 2c1 and the outlet sockets 7a1, 7b1, 7b2 in such a way as described above with reference to FIG. 1.

The tubular conduits 6a, 6b, 6c are connected between the insulating material nozzles in the bores 2a2, 2b2, 2c2 and the outlet sockets 7a2, 7b2, 7c2 in such a way that the insulating material nozzle in the bore 2a2 is connected to the outlet socket 7b2, that the insulating material nozzle in the bore 2b2 is connected to the outlet socket 7a2, and that the insulating material nozzle in the bores 2c2 is connected to the outlet nozzle 7c2.

The tube conduits are, furthermore, connected between the following insulating material nozzles in the bores and the output sockets in a way as described above with respect to the insulating material nozzles in the bores 2a1, 2a2, 2a3; 2b1, 2b2, 2b3; 2c1, 2c2, 2c3 (see FIG. 3) and the outlet sockets 7a1, 7a2, 7a3; 7b1, 7b2, 7b3; 7c1, 7c2 and 7c3.

If the gas valve 8b is opened for a short time, a gas amount reaches the tubular manifold 7 from the pressure conduit 8a through the gas injector 9 and exits by merely from the outlet sockets 7b1, 7b2, 7b3 of the second row. Accordingly, a partial amount of the driving gas reaches the insulating material nozzle Da2 through the outlet socket 7b2 and effects a short term, local circulation of the anode bed out of loosely supported metal granulates on the left hand side.

The metallic anode granules are moved by the tubular manifold 7 and the insulating material nozzles Da1, Da2, Da3; Db1, Db2, Db3; Dc1, Dc2 and Dc3 of the device of the invention alternatively on the left hand side and the right hand side of the cell box such that, in effect, a slow circulation of all anode granules takes place, and this operation is independent of the quality of the metal granules.

The invention claimed is:

1. Anode device for an electro-flocculation cell, comprising
a bed of metal granules through which raw water is flown from the bottom to the top, the bed of metal granules being loosely provided in a cell box of insulating material on an electrically conducting electrode plate, provided with insulating material nozzles inserted therein and arranged in several rows, serving as current feeding means to the bed of metal granules;
non-conducting, hydraulic tube connections from the insulating material nozzles to connection sockets of a tubular manifold for raw water;
at least two gas injector sockets which are arranged in different axial portions along the tubular manifold for the supply of a driving gas, and which are provided to protrude into the tubular manifold and which are connected to a gas supply device, the gas supply device for providing a pulsed supply of driving gas to the at least two gas injector sockets by means of which pulsed driving gas is injected into the at least two gas injector sockets;
wherein the tubular manifold comprises the connection sockets in rows in lines next to each other including a central row and side rows on an upper side of the tubular manifold and along the length thereof for connection to the insulating material nozzles wherein a number of connection sockets and the rows thereof correspond to a number and rows of the insulating material nozzles, and wherein the connection sockets of the central row of connection sockets are alternatively connected along the row to the corresponding insulating material nozzles located on one side end area of the electrically conducting electrode plate and to the corresponding insulating material nozzles which are located on an opposite side end area of the electrically conducting electrode plate;

whereby fluid connections for the driving gas and the raw water are provided to the cell box such that the metal granules are moved by the gas pulses alternatively on the one end side and the other end side of the cell box.

2. Anode device as claimed in claim 1, wherein the metal granules consist of cast iron chips which are a particularly low priced raw material.

3. Anode device as claimed in claim 1, wherein the metal granules consist of magnesium granules or aluminum granules or a granular aluminum magnesium alloy.

4. Anode device as claimed in claim 1, wherein the electrically conducting electrode plate consists of a support plate and a metal layer which forms a contact surface to the metal granules.

5. Anode device as claimed in claim 4, wherein the metal layer consists of a noble metal.

6. Anode device as claimed in claim 4, wherein the electrically conducting electrode plate for supporting the metal granules is arranged horizontally and forms a bottom of the cell box.

7. Anode device as claimed in claim 1, wherein the electrically conducting electrode plate for the metal granules consists of copper or brass or iron.

8. Anode device as claimed in claim 1, wherein the insulating material nozzles consist of polypropylene or ceramic material.

9. Anode device as claimed in claim 1, wherein the non-conducting hydraulic tube connections consists of polyethylene or ethylene-propylene-diene (EPDM) resin or softened polyvinylchloride.

10. Anode device as claimed in claim 1, wherein the non-conducting, hydraulic tube connections have a length of at least 0.5 meters each.

11. Anode device as claimed in claim 1, wherein an inner diameter of the hydraulic tubular manifold is four to ten times as large as an inner diameter of the non-conducting hydraulic tube connection.

12. Anode device as claimed in claim 1, wherein the gas supply device includes air injector sockets arranged radially to the tubular manifold by means of which the driving gas is injected as pulses into the tubular manifold wherein the air injector sockets are preferably not arranged on the same axial portion of the tubular manifold.

13. Anode device as claimed in claim 1, wherein the electrically conducting electrode plate for supporting the metal granules is covered by a layer of noble metal and is fixed by means of an insulating flange from below to a cell box which is open to the top.

14. Anode device as claimed in claim 1, wherein the cell box is widened to the top thereof.

15. Anode device as claimed in claim 1, wherein, in the cell box below the water level but above the metal granules, a metal cathode in form of a grid or metal sieve is fixed and movable upwards and downwards.

16. Anode device as claimed in claim 15, wherein a direct current source is connected to the electrically conducting electrode plate with the positive terminal and the metal cathode with the negative terminal, the current source providing a direct voltage of about 40 to 400 Volts.

17. Anode device as claimed in claim 5, wherein the metal layer consists of silver or platinum or a silver platinum alloy.

18. Anode device as claimed in claim 10, wherein the non-conducting, hydraulic tube connections have a length of 1 to 3 meters.

19. Anode device as claimed in claim 1, wherein the connecting sockets of the tubular manifold are not arranged on the same axial portion thereof.

* * * * *